(12) United States Patent
Declerck et al.

(10) Patent No.: US 9,983,848 B2
(45) Date of Patent: May 29, 2018

(54) CONTEXT-SENSITIVE IDENTIFICATION OF REGIONS OF INTEREST IN A MEDICAL IMAGE

(71) Applicant: Siemens Medical Solutions USA, Inc., Malvern, PA (US)

(72) Inventors: Jerome Declerck, Oxford (GB); Matthew David Kelly, Botley (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 174 days.

(21) Appl. No.: 14/884,816

(22) Filed: Oct. 16, 2015

(65) Prior Publication Data
US 2016/0110160 A1    Apr. 21, 2016

(30) Foreign Application Priority Data
Oct. 16, 2014  (GB) .................................. 1418319.8

(51) Int. Cl.
*G06K 9/00*    (2006.01)
*G06F 3/16*    (2006.01)
*G06T 7/11*    (2017.01)

(52) U.S. Cl.
CPC ................ *G06F 3/167* (2013.01); *G06T 7/11* (2017.01); *G06T 2207/10072* (2013.01); *G06T 2207/20104* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 2002/0028006 A1* | 3/2002 | Novak | G06F 19/321 382/128 |
| 2007/0106501 A1* | 5/2007 | Morita | G06F 3/015 704/200 |
| 2009/0187407 A1 | 7/2009 | Soble et al. | |
| 2013/0346891 A1* | 12/2013 | Hayball | G06F 3/0481 715/764 |

\* cited by examiner

*Primary Examiner* — Atiba O Fitzpatrick
(74) *Attorney, Agent, or Firm* — Schiff Hardin LLP (57) ABSTRACT

A voice controlled system uses context-sensitive interpretation of voice comments received by a voice recognition system to identify a region of patient image data identified by a verbal comment.

14 Claims, 5 Drawing Sheets

Right_Lung_VOI_1
SUVmax: 7.3
SUVpeak: 5.6
Met. Vol.: 24.2ml

FIG 5

Right_Med_LN_stn 12_1
SUVmax: 5.3
SUVpeak: 3.9
Met. Vol.: 7.2ml

FIG 8

CONTEXT-SENSITIVE IDENTIFICATION OF REGIONS OF INTEREST IN A MEDICAL IMAGE

BACKGROUND OF THE INVENTION

Field of the Invention

The present invention relates to a method, system and device for context-sensitive identification of regions of interest in a medical image.

Description of the Prior Art

Medical imaging processes such as PET provide functional image data representing the functioning of a patient's body, while imaging processes such as MRI or x-ray CT provide anatomical image data, representing the patient's anatomy. It is common to evaluate corresponding anatomical and functional data together, to match functional information with anatomical localisation.

Clinical assessment of an oncological PET functional scan begins with a clinician performing a visual assessment of radiotracer distribution in order to identify abnormal patterns of uptake which may be indicative of malignant lesions or other pathologies.

This clinical review ("read") of functional PET data by a trained clinician is typically supported by an assessment of co-acquired anatomical CT data. The combined PET/CT assessment is a sophisticated process requiring a lot of concentration by the clinician and a responsive and flexible software application to support the read with minimal interruptions to the flow of concentration of the clinician.

Once the clinician has formed a clear understanding of the patient condition from the image data, their findings must be documented in a report for a referring physician to inform the treatment decision. Creation of such documentation is typically a cumbersome task that does not in itself require expert clinical reasoning. Expert clinical reasoning is required for the assessment, but the report-writing rather requires an ability to describe synthetically and clearly the location and classification of any abnormalities along with the clinical impression based on these findings.

During the interpretation of the patient image data, the act of making measurements interrupts the clinician during the clinical read, due to the need to manipulate software and perform the relevant measurements.

The case is then revisited for the reporting of the findings, typically via a dictated report.

The format of such reports varies considerably from one institution to another, despite communal efforts toward standardization. A common step in the creation of the report is the description of the clinical findings such as perceived abnormalities. It would be useful to provide a standard report format for consistency and to aid the referring physician who may receive such reports from several sources.

In a typical workflow, the clinician first identifies features within the patient image data which appear to represent lesions. Appropriate measurements are typically then performed on the image features, such as lesion size; tracer uptake. The clinician then reviews the findings to describe the case and uses a dictation system to transcribe this description into a report. The clinician will also re-read the report once it is created. The report may be created by another person who has not read the case and only formats the report for the clinician.

Such multiple reviews of a single patient data set are inefficient. There is also the possibility of errors in the transcription, such as a lesion reported with an incorrect measurement value; a lesion identified to the wrong organ, etc.

SUMMARY OF THE INVENTION

An object of the present invention is to simplify the reviewing and reporting process by automatically compiling the relevant information needed for reporting as the clinician reads the case. This is achieved using a context-sensitive method for identifying features in patient image data based on a description provided by a reading clinician.

DESCRIPTION OF THE PREFERRED EMBODIMENTS

The present invention employs a combination of automatic determination of possible descriptions for possible regions of interest represented in patient functional data using an awareness of which possible regions of interest are currently rendered to the screen in a display visible to the clinician, and then selecting from this list, the possible region of interest that most closely matches the verbal description given by the clinician, given the context of the displayed data viewed by the clinician. Uncertainties are introduced by each of the components. For example, the conversion of voice to text is error prone; automatic labelling of the possible regions of interest may identify a range of possible labels with different 'likelihoods' for any one particular region. The optimal performance of the method and system of the present invention will require more than a simple combination of these components. A consideration of the inherent uncertainties from each component in a context-sensitive manner provides a determination of the most likely solution.

In some cases, the method of the present invention does not identify a single most likely feature, but provides approaches for handling a situation when a single region cannot be confidently selected.

In presently-preferred embodiments, the method of the present invention employs a voice controlled system to support the identification of features and/or the taking of measurements during the clinician's interpretation ("read") of the patient image data.

Figure 1:
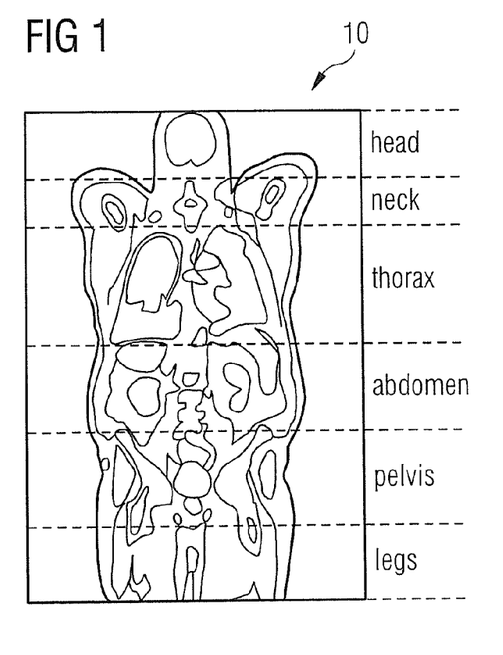
FIG. 1 shows an example of a patient anatomical image data set.

FIG. 1 represents an example patient anatomical image data set 10. In particular, FIG. 1 shows a typical x-ray computed tomography (CT) patient anatomical data set with automatically-segmented organs, and anatomical areas shown by dashed lines as computed from anatomical landmarks detected from the CT image.

Figure 2:
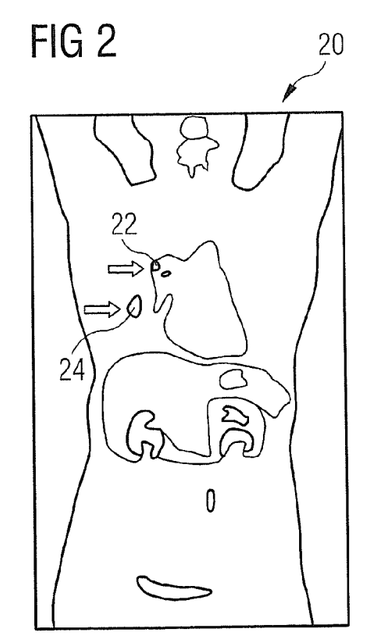
FIG. 2 shows a corresponding example patient functional image data set.

FIG. 2 represents a corresponding example patient functional image data set 20. In particular, FIG. 2 shows a typical PET-CT patient image data for a patient with a primary tumour in the right lung and ipsilateral lymph node metastases. In FIG. 2, dark regions 22, 24 identified with arrows resemble representations of a primary tumour in the right lung, in the case of region 24, and ipsilateral lymph node metastases, in the case of region 22.

In a method of the present invention, the anatomical data set 10 is segmented, using a method known in itself to those skilled in the art, to define three-dimensional regions within the anatomical data which correspond to known organs.

Figure 3:
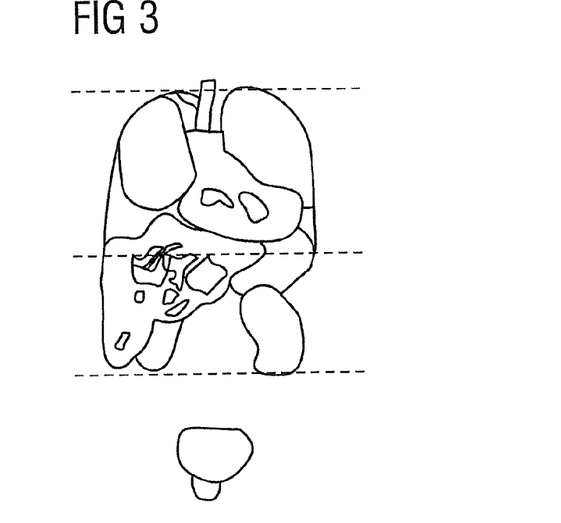
FIG. 3 shows a surface rendering of segmented organs as represented in FIG. 1.

FIG. 3 represents surface rendering of various segmentations of the anatomical image data set 10. Representations of various organs in the thorax, abdomen and pelvis regions of the patient image data set are identified. As is known in the art, each segmentation may have a label associated with it, identifying the corresponding organ.

Figure 4:
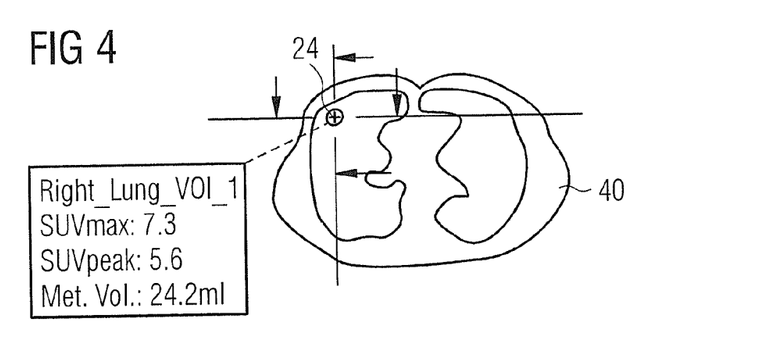
FIGS. 4 and 5 show axial slices of patient functional image data annotated with automatically generated labels and measurements.
Figure 5:
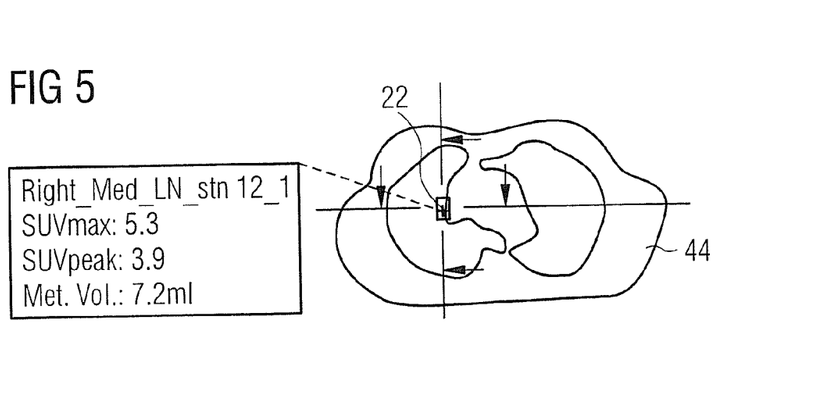

As is conventional, a clinician reads a set of patient image data set from top to bottom, that is, starting at the head end. Typically, the clinician uses a coronal projection view such as shown in FIGS. 1 and 2 to select axial slices which represent image data in a plane perpendicular to the plane of FIGS. 1 and 2. Examples of such axial slices of functional data are represented in FIGS. 4 and 5.

Conventionally, the reviewing clinician navigates through the axial slices using a computer mouse or similar physical-contact data input device to select relevant areas of interest. Such a method may be used in the present invention, or a voice recognition system may be employed to perform a similar process of navigation through axial slices. Alternative methods for navigating the patient image data set may of course be employed.

The system of the present invention includes a segmentation device which segments features within the functional image data into possible volumes of interest.

When the clinician reviews the patient image data set, a dictation device, which may be embodied in software within the voice controlled system, may be used in embodiments of the present invention to comment on any findings that they regard as worthy of inclusion in the report, for instance, "there is a suspicious lesion in the right lung".

According to a feature of the present invention, this comment is received by a voice recognition subsystem, which may be embodied in software within the voice controlled system. The voice controlled system interprets the received comment and automatically identifies the most-likely segmented feature the clinician is referring to from the received voice description using a context-sensitive method which will be discussed in further detail below.

According to preferred embodiments of the present invention, this automatic identification of the most-likely segmented feature is performed in a context-sensitive manner using a combination of anatomical knowledge, for example derived from conventional organ segmentation of the underlying MR or CT image data 10, 20 and an assessment of the local voxel intensity distribution in the corresponding segmentation of the functional and/or anatomical image data sets to provide possible volumes of interest.

As an alternative to the above-mentioned organ segmentation method, the required anatomical knowledge may be obtained from automatically detected anatomical landmarks. The reading clinician may then identify a possible volume of interest by reference to its proximity to such anatomical landmarks in a viewed rendering of the patient image data.

The assessment of local voxel intensities enables the system to identify likely lesions within the patient image data, and these likely lesions are segmented into possible volumes of interest which are then matched by the system to the clinician's comments.

For example, using the patient data represented in FIGS. 1 and 2, and the clinician's comment "there is a suspicious lesion in the right lung", segmentation of the anatomical data of FIG. 1 identifies the "right lung". The voice controlled system of the present invention recognises the label "right lung", and limits further consideration of patient data to the patient data within the region identified as "right lung". This is an element of a context-aware method of the present invention.

Within the organ segmentation labelled "right lung", two segmented regions 22, 24 of high voxel data values are identified—shown by arrows in FIG. 2. The clinician's comment "lesion in right lung" may be interpreted by the voice controlled system to indicate one of those two regions. The remainder of the comment "there is a suspicious . . . " may be interpreted by the system as superfluous, and discarded. In certain embodiments, however, adjectives such as "suspicious"; "possible"; "likely" may be used by the system to identify regions of high voxel data values of a suitable clarity, size and/or intensity represented by such description.

Similarly, adjectives such as "large", "small", "round", "elongate" may be used by the clinician and interpreted by the system to identify the most likely region as the subject of the clinician's comments.

The voice controlled system may then further interpret the clinician's comment to determine which of these two segmented regions 22, 24 of high voxel data values the clinician is referring to.

FIG. 4 shows an axial slice 40 of the functional patient data set 20, corresponding to a position in the lungs. This slice passes through region 24 of high voxel data values also represented in FIG. 2. In this example, the clinician is viewing this axial slice 40 when making the comment "there is a suspicious lesion in the right lung".

The system could use the constraint that the region of high voxel data values the clinician refers to is visible in at least one of the coronal, axial or sagittal slices displayed at the time the clinician provides the description. This awareness of which regions 22, 24 are presently viewed by the clinician provides an element of a context-sensitive method of the present invention.

In the present example, as only one of the identified regions 22, 24 of high voxel data values is visible in the axial slice 40 currently being viewed, the voice controlled system of the present invention makes a context-sensitive interpretation that the region of high voxel data values referred to by the clinician is the one 24 shown in the presently-viewed slice 40, as the other identified possibility, region 22, is not visible in the viewed axial slice. This may be the case even if both regions of high voxel data values are shown in coronal, or sagittal slices displayed at the time.

The present invention accordingly provides a voice controlled system which used context-sensitive interpretation of voice comments received by a voice recognition system to identify a region of patient image data identified by a verbal comment.

The system may proceed to automatically compute and display relevant measurements that are associated with the identified region. The types of measurement which are performed may be preselected by the clinician according to personal preference, or as determined by the type of malady sought by the reading process. Alternatively, or in addition, the system may be arranged to perform a default set of measurements in the absence of preselected measurement types.

In the example shown in FIG. 4, the region identified by the context-sensitive interpretation of voice comments received by a voice recognition system is region 24 and has been automatically labelled "Right_Lung_VOI_1" by the system. The label "Right_Lung" may be the label of the corresponding organ segmentation, or image region defined by spatial relationship to anatomical markers. Alternatively, it may be derived from the voice recognition of the comment. The remainder of the label "_VOI_1" may be used to indicate that this region is the first volume of interest to be identified within the right lung. Other labelling conventions may of course be used with similar effect.

Three measurements are also shown, along with the label, in a box associated with the region 24 of high voxel data values identified by the system. In this example, the measurements are: SUVmax (the value of the voxel with the highest SUV in the segmented lesion VOI); SUVpeak (the mean value from a 1 $cm^3$ sphere positioned within the segmented lesion VOI so as to maximise this mean value); Metabolic Tumour Volume (MTV) (the spatial volume of the segmented lesion VOI 24).

The system may be set up to automatically calculate these three values for each identified region of high voxel data values, or they may have been specifically requested by the clinician.

For example, when reviewing the patient image data, the clinician could say the command "RECIST measurement for the right lung lesion". The voice controlled system would recognise "the right lung lesion" as the already-identified region of high voxel data values 24. The voice recognition system would also recognise "RECIST measurement" as one of a set of predefined measurement algorithms available to the voice controlled system. A corresponding computation of the RECIST measurement in the part of the CT image 10 corresponding to segmented region 24 and display of the information on the screen would be performed in response to this recognition, without the clinician having to perform any physical-contact data entry, such as computer mouse operation. Such physical-contact data entry is believed to distract the clinician's concentration on interpreting the presented patient image data, and so is avoided according to a feature of certain embodiments of the present invention.

In addition, or alternatively, to the default or pre-selected measurements, the reading clinician may request calculation of appropriate measurements once a volume of interest has been identified by the system according to the present invention. For example, the clinician could say "SUV max, peak and metabolic volume from 50% max", which would trigger the system to compute these quantities automatically from the PET data and display them on the screen.

In some instances, there may be ambiguity in the region selection, for instance, when multiple regions of high voxel data values are visible to the clinician and the information recorded by the dictation system and voice recognition system does not help disambiguate multiple possible candidates. In other instances, errors may occur such that the region selected by the system is not the one intended by the clinician. In such cases, the clinician could either confirm which one is to be reported using a computer mouse or similar physical-contact input device, or the clinician could provide further spoken information such as "the one closer to the heart", "not that one", "the most superior lesion", or strategic hints like "all lymph nodes in station 7 as a group", etc. until the clinician is satisfied with the choice of region made by the system, representing the appropriate volume of interest in 3D patient image data.

Lymph nodes in the mediastinum are conventionally grouped into spatially distinct regions, called "stations". These stations are defined based on nearby anatomical features and are numbered. Station 7 is one of these regions.

Alternatively, where the system has been unable to distinguish the user's intention with certainty among a plurality of possible regions of interest, the system could label each identified possible region of interest with a different label such as "A", "B", "C", etc., and the clinician could select the required region by selecting the corresponding label, for example by voice or by using a physical-contact input device such as a computer mouse.

The invention is further illustrated by further reference to the patient image data represented in FIG. 2, which shows a MIP of a typical lung cancer PET scan with a primary tumour in the right lung and ipsilateral lymph node lesions. The MIP represents the image with the maximum intensities along the line of sight, and is an effective way to summarise a case where areas of high uptake are typically worthy of investigation.

The reading clinician is likely to be reading slice 44 shown in FIG. 5 when identifying the suspected ipsilateral lymph node. The clinician may respond to this findings by saying "ipsilateral lymph node". The system identifies region 22 as being the most probable region as the subject of the clinician's comment.

The system may name this region according to its position within an organ segmentation and/or the description given by the reading clinician.

In this example, shown in FIG. 5, the name allocated is "Right_Med_LN_stn12_1", indicating RIGHT MEDiastinal Lymph Node identified by STatioN 12, and the first volume of interest identified by these labels. As discussed with reference to FIG. 4, certain measurements and calculations may be made, in this example SUVmax, SUVpeak and Metabolic Tumour Volume (MTV).

Should the reading clinician disagree with the allocated label, it could be corrected either by voice instructions or by a physical-contact data input device such as a computer mouse. For example, the reading clinician can correct the system by providing a partial new name: "incorrect station: station 6". This comment would be received and interpreted by the system, which would react by changing the name of the region to "Right_Med_LN_stn6_1".

Alternatively, or in addition, the system may propose a selection of possible names for the identified region, and the reading clinician could choose from among them using a physical-contact data entry device such as a computer mouse or by voice commands.

The system may propose a drop-down menu of suggested possibilities, for example:

"Right_Med_LN_stn12_1"
"Right_Med_LN_stn6_1"
"Other: Please specify".

The system may arrange these alternatives alphabetically or in descending order of a calculated probability of correctness.

In alternative embodiments, the naming of a region of interest may be determined by comparing location, shape, and SUV measurements of the region of interest, along with distribution of regions of interest in patient, to a database of records of previously-labelled regions of interest. A similarity index may be calculated by comparing features such as anatomical location, PET and CT data intensity distribution, lesion size of the region of interest to be named, along with distribution of regions of interest in patient, with the records in the database, and the record, or records, having the highest similarity index providing an example name upon which a name for the new region of interest may be based.

According to aspects of the present invention, the described identification of possible volumes of interest by matching features of the image data with descriptions provided by the reading clinician may be used to trigger delineation and other measurements, as described above, and may also be used to associate the identified volume of interest with other functions of system software, for instance, generation of snapshots, creation of material for structured reporting, annotation mark-up for the image for supporting follow-up reads or retrospective analysis, etc.

Typically, the identified regions of interest with their associated measurements, description and further comments made by the reading clinician will be collated and stored in a report format for provision to a referring physician. The reading clinician may be given an opportunity to revise the report, but it will not require the full review conventionally required, as the clinician will have generated the content of the report during the read, and the report will be presented by the system of the present invention in a standard format, making interpretation of multiple reports from multiple sources much simpler for the referring physician.

According to the methods and systems of the present invention, there is provided automatic delineation and measurements of possible regions of interest in a patient medical image data set. The patient medical image data set typically comprises both anatomical and functional data.

Methods of the present invention may involve
preprocessing, such as segmentation and anatomical parsing, of anatomical data associated with the functional data;
identifying possible regions of interest within the functional data;
parsing and recognition of voice input specifying a region of interest to be segmented;
interpretation of the voice input to select the most likely of the identified possible regions of interest to correspond to the voice input according to an anatomical or clinical description within the voice input;
calculation of measurements related to the selected region of interest.

Figure 6:
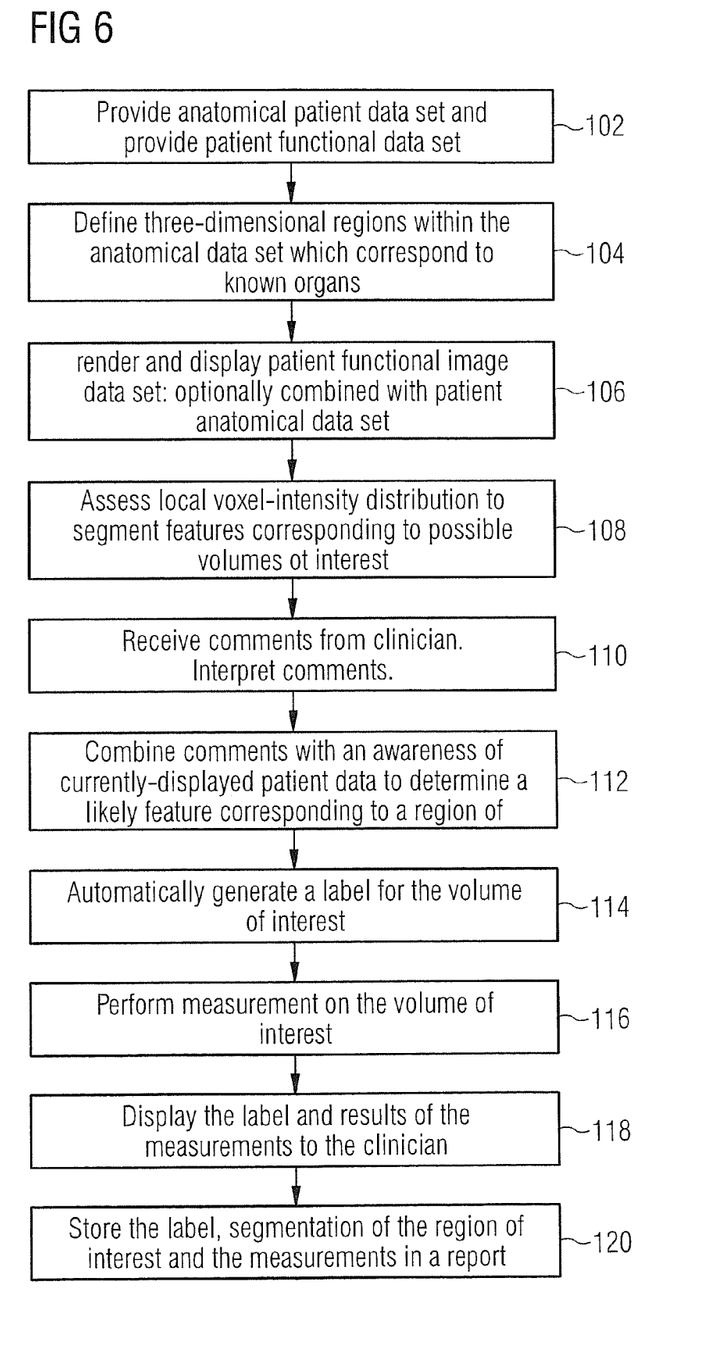
FIG. 6 shows steps of the method according to an embodiment of the present invention.

FIG. 6 shows steps in an example method according to an embodiment of the present invention.

In the illustrated method, step 102 recites providing anatomical patient data set and provides patient functional data set. Step 104 recites defining three-dimensional regions within the anatomical data set which correspond to known organs. Step 106 recites rendering and displaying the patient functional image data set: optionally combined with the patient anatomical data set. Step 108 recites assessing local voxel-intensity distribution to segment features corresponding to possible volumes of interest. Step 110 recites receiving comments from clinician and interpreting those comments. Step 112 recites combining those comments with an awareness of currently-displayed patient data to determine a likely feature corresponding to a region of interest identified by the clinician. Step 114 recites automatically generating a label for the volume of interest. Step 116 recites performing measurements on the volume of interest. Step 118 recites displaying the label and results of the measurements to the clinician. Step 120 recites storing the label, segmentation of the region of interest and the measurements in a report.

Figure 7:
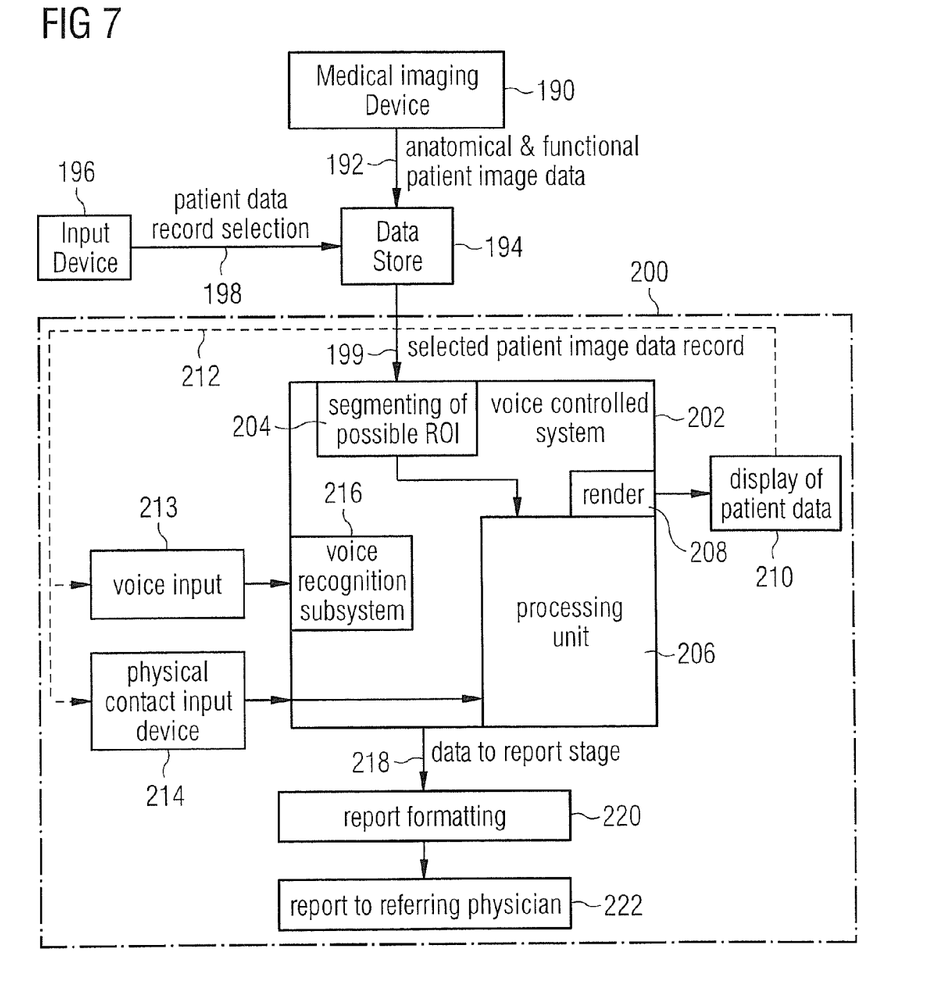
FIG. 7 is a block diagram of a system according to an embodiment of the present invention.

FIG. 7 shows a block diagram of a system 200 according to an embodiment of the present invention.

A conventional medical imaging device 190 acquires and provides anatomical and functional patient image data 192 to a data store 194. An input device 196 operated by a user provides patient data record selection signals 198 to the data store to select a patient data record for study. In response, a selected patient image data record 199 is provided to the system 200 of the present invention.

The selected patient image data record 199 is received by a voice controlled system 202. The patient data record is treated by regimenting of possible regions of interest 204, typically by identifying regions of high local voxel data values. The data record and the segmentation of possible regions of interest are provided to a processing unit. The data is rendered and displayed on a display 210 for viewing by the reading clinician. The reading clinician reviews the displayed data, and responds by providing voice commands and comments to a voice input subsystem or a physical-contact input device 214, such as a computer mouse. The clinician's activity in viewing data records and providing commands and comments effectively provides a feedback loop 212 shown by a dashed line in FIG. 7.

Voice input signals are transmitted from voice input subsystem 213 to voice recognition subsystem 216 within voice controlled system 200. The voice input comments and comments are recognised and interpreted into a form suitable for provision to processing unit 206.

The processing unit 206 acts on the patient data record 199 according to input commands and comments provided by the reading clinician as described above. As the reading clinician completes each stage of the review, or at the end of the review if preferred, data 218 representing the clinician's findings and comments are provided to a report stage, including an arrangement 220 for report formatting, which produces as an output a report 222 to the referring physician. The reading clinician may review this report before it is sent.

Figure 8:
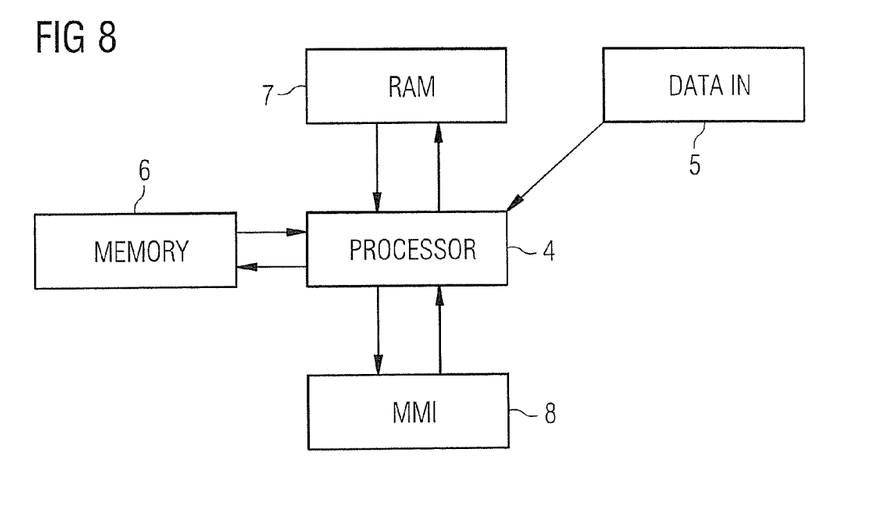
FIG. 8 schematically illustrates an apparatus according to an embodiment of the invention.

The system of the present invention may be at least partially implemented in software within a general-purpose computer. FIG. 8 illustrates such an embodiment of the present invention.

For example, a central processing unit 4 is able to receive data representative of medical scan data via a port 5 which could be a reader for portable data storage media (e.g. CD-ROM); a direct link with apparatus such as a medical scanner (not shown) or a connection to a network.

For example, in an embodiment, the processor performs such steps as automatically identifying and segmenting possible regions of interest within functional patient image data, displaying the functional patient image data to a user in one or more views, receiving comments from the user regarding a region of interest, evaluating, in the context of the views presented to the user, and the comments, which of the segmented possible regions of interest is most likely to be the subject of the user's comments; and displaying a representation of that region of interest to the user.

Software applications loaded on memory 6 are executed to process the image data in random access memory 7.

A Man-Machine interface 8 typically includes a keyboard/mouse/screen combination (which allows user input such as initiation of applications) and a screen on which the results of executing the applications are displayed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for identifying a region of interest within patient functional image data, comprising:
   providing patient functional image data to a computer and, in said computer, automatically identifying and segmenting candidate regions of interest within the patient functional image data, said patient functional image data thereby comprising all of the candidate regions;
   displaying the patient functional image data at a user interface of the computer, in at least one view;
   receiving verbal comments, that form a description of a region of interest, into the computer from a user via a voice input interface of the computer and, in said computer, automatically interpreting said verbal comments by executing a voice recognition algorithm in the computer;
   in said computer, automatically reducing a number of said candidate regions to a limited number of candidate regions taken from said at least one view, based on a first descriptive item of the region of interest contained in the interpreted verbal comments, said limited number of candidate regions being fewer than all of said candidate regions, and automatically searching in said computer among only said limited number of candidate regions of interest, in order to then identify a candidate region that most closely corresponds to the description of the region of interest, based on a second descriptive item of the region of interest contained in the interpreted verbal comments; and
   displaying said most closely corresponding region of interest at said user interface.

2. A method as claimed in claim 1 comprising, receiving, as said verbal comments, respective descriptions of a plurality of regions of interest and evaluating each verbal description to identify a region of interest, among said candidate regions of interests, that most closely corresponds thereto, and allowing further interaction with said computer by said user to select one region of interest among said most closely corresponding regions of interest.

3. A method as claimed in claim 2 comprising implementing said further interaction verbally, with a further voice input via said voice input interface and by interpreting said further voice input with said voice recognition algorithm.

4. A method as claimed in claim 1 comprising, in said computer, automatically generating a name for said most closely corresponding region of interest.

5. A method as claimed in claim 4 comprising automatically generating said name by identifying an anatomical location of said most closely corresponding region of interest, and dependent on a description thereof.

6. A method as claimed in claim 5 comprising obtaining said description from said verbal comments.

7. A method as claimed in claim 5 comprising obtaining said description by a comparison of said most closely corresponding region of interest with a database of records of previously-labeled regions of interest.

8. A method as claimed in claim 1 comprising, in said computer, automatically performing a measurement of said most closely corresponding region of interest according to a predetermined list of measurements to be performed, which is accessed by said computer.

9. A method as claimed in claim 1 comprising performing a measurement of said most closely corresponding region of interest in said computer, according to an instruction entered into said computer by the user.

10. A method as claimed in claim 9 comprising entering said instruction verbally as a further voice input via said voice input interface, and interpreting said instruction with said voice recognition algorithm.

11. A method as claimed in claim 1 comprising formatting data concerning said most closely corresponding region of interest, and providing the formatted data into a report in said computer, and making said report available in electronic form from said computer.

12. A system for context-sensitive identification of regions of interest, comprising:
   a computer provided with patient functional image data to a computer, said computer being configured to automatically identify and segment candidate regions of interest within the patient functional image data, said patient functional image data thereby comprising all of the candidate regions;
   a display monitor in communication with said computer, being configured to display the patient functional image data at said display monitor a user interface of the computer, in at least one view;
   said computer comprising a voice input interface, and said computer being configured to receive verbal comments, that form a description of a region of interest, via said voice input interface, and computer being configured to automatically interpret said verbal comments by executing a voice recognition algorithm in the computer;
   said computer being configured to automatically reduce a number of said candidate regions to a limited number of candidate regions taken from said at least one view, based on a first descriptive item of the region of interest contained in the interpreted verbal comments, said limited number of candidate regions being fewer than all of said candidate regions, and automatically searching in said computer among only said limited number of candidate regions of interest, in order to then identify a candidate region that most closely corresponds to the description of the region of interest, based on a second descriptive item of the region of interest contained in the interpreted verbal comments; and
   said computer being configured to display said most closely corresponding region of interest at said display monitor.

13. A system as claimed in claim 12 wherein said computer is configured to execute a report formatting algorithm to generate a report concerning said most closely corresponding region of interest, and to make said report available in electronic form from said computer.

14. A non-transitory, computer-readable data storage medium encoded with programming instructions, said storage medium being loaded into a computer and said programming instructions causing said computer to:
   receive patient functional image data and automatically identify and segment candidate regions of interest within the patient functional image data, said patient functional image data thereby comprising all of the candidate regions;
   display the patient functional image data at a user interface of the computer, in at least one view;
   receive verbal comments, that form a description of a region of interest, from a user via a voice input interface of the computer, and automatically interpret said verbal comments by executing a voice recognition algorithm;
   automatically said candidate regions to a limited number of candidate regions taken from said at least one view, based on a first descriptive item of the region of interest contained in the interpreted verbal comments, said limited number of candidate regions being fewer than all of said candidate regions, and automatically searching in said computer among only said limited number of candidate regions of interest, in order to then identify a candidate region that most closely corresponds to the description of the region of interest, based on a second descriptive item of the region of interest contained in the interpreted verbal comments; and display said most closely corresponding region of interest at said user interface.

\* \* \* \* \*